Patented June 1, 1943

2,320,676

UNITED STATES PATENT OFFICE 2,320,676

ARC WELDING ELECTRODE

Clinton E. Swift, Hales Corners, Wis., assignor to Ampco Metal, Inc., Milwaukee, Wis., a corporation of Wisconsin No Drawing. Application July 24, 1942, Serial No. 452,170

5 Claims. (Cl. 219—8)

This invention relates to arc welding electrodes and more particularly to such electrodes constructed of bronze and having a covering for protecting the metal as it is deposited and until solidified in the weld.

In general, copper alloy electrodes have a tendency to produce welds that are hot short, which makes welding therewith very difficult. Most of the commercial arc welding of copper alloys has been accomplished with electrodes of medium strength, such as phosphor bronze and silicon bronze electrodes. Such electrodes ordinarily produce weld metal that is hot short. They particularly have a tendency to produce welds subject to hot shortness when employed in the welding of brass and of bronzes containing large amounts of zinc. Due to the greater hardness and lower cold ductility of weld metal deposited from aluminum iron bronze electrodes, such as those specifically disclosed in the United States Letters Patent No. 2,238,392 granted to Milan A. Matush, the latter have not been applied to the welding of stiff structures such as iron castings and the like.

The object of the present invention is to provide a bronze electrode that will produce welds of good strength and cold ductility and that has less tendency toward the production of hot short welds in stock such as brass or manganese bronze.

Another object is to provide a bronze welding electrode suitable for welding rigid structures of cast iron and the like.

The invention is based upon the discovery that aluminum bronzes that are free of iron or substantially low in iron content do not produce hot short weld metal, when welding brass and other copper-zinc base alloys.

The invention has been embodied in an aluminum bronze electrode which is either free from iron or has a very low iron content. A suitable core composition is as follows:

| | Per cent |
|---|---|
| Copper | 89.6 |
| Aluminum | 9.0 |
| Iron | 1.0 |
| Impurities | 0.4 |

The aluminum content may vary from about 5% to about 11%. Below 5% the aluminum is generally ineffective, and above 11% of aluminum results generally in a decrease in desirable physical properties.

The iron content should be less than 2% and may be omitted altogether. The elimination or restriction of iron in the electrode prevents any possibility of the formation of an iron-zinc phase in the deposit when welding manganese bronze or brass, a phase which is thought to be instrumental in making former weld deposits hot short.

Furthermore, the low iron aluminum bronze has been found to produce a weld deposit which has greater ductility and a greater spread between yield point and ultimate strength. This has advantage in the welding of rigid structures in which the low yield point of the deposit results in a yielding of the deposited metal under stress upon cooling of the weld rather than a cracking of the structure adjacent the weld, which might result from a less ductile deposit. The ultimate strength of the deposit is usually higher than that of the base and the welds are, therefore, of ample strength in service. Such electrodes are particularly adapted to the welding of heavy cast iron structures.

A flux should be provided preferably as a covering for the electrodes, such as the cover set forth in the Matush patent above referred to. The preferred composition of covering is about equal parts of cryolite and sodium fluoride, and sodium silicate added as a binder. The covering is mixed with sodium silicate solution to a suitable consistency for dipping the rods, or to a stiffer consistency for extrusion upon the rods. After applying the covering to the rod the electrode is heated in an oven to dry the covering.

Another covering which may be employed is that set forth by applicant in his co-pending application Serial No. 459,843, filed September 26, 1942. In this covering a quantity of carbon or ground glass is added to the ingredients above mentioned, to provide a mechanically stronger and more adherent covering than that disclosed by the above-mentioned Matush patent.

The invention may have various embodiments within the scope of the accompanying claims.

I claim:

1. A covered arc welding electrode of aluminum bronze containing less than 2% iron.
2. A covered arc welding electrode of aluminum bronze substantially free of iron.
3. A covered arc welding electrode of aluminum bronze containing less than 2% iron and from about 5 to 11% aluminum.
4. A covered arc welding electrode of aluminum bronze containing less than 2% iron and less than 11% aluminum, the balance being substantially of copper.
5. A metallic arc welding electrode of aluminum bronze containing up to about 11% aluminum and substantially free of iron, and a covering therefor comprising principally fluxes for aluminum oxide.

CLINTON E. SWIFT.